Figure 7:

(No Model.) 2 Sheets—Sheet 1.
J. B. D'A. BOULTON.
PROCESS OF FORMING INGOTS.
No. 388,336. Patented Aug. 21, 1888.
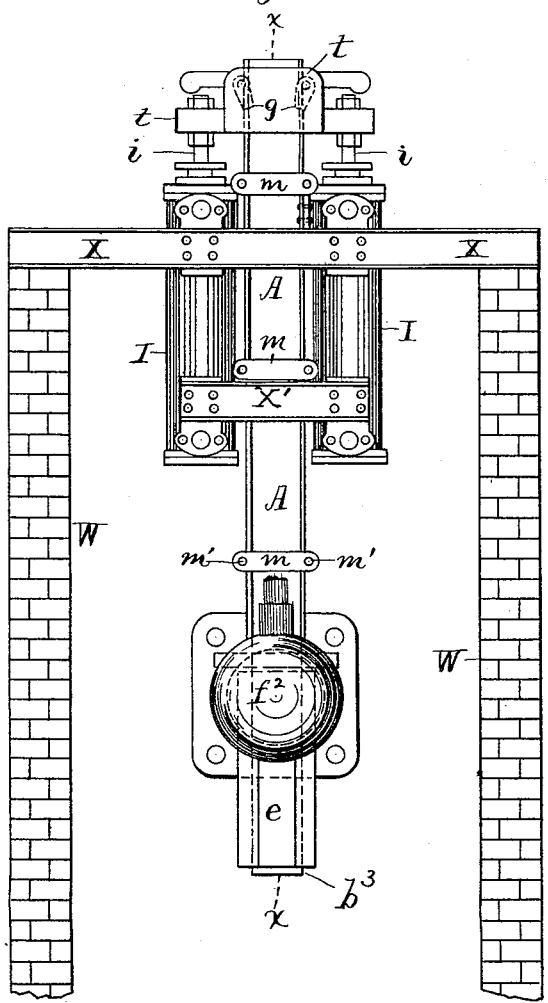
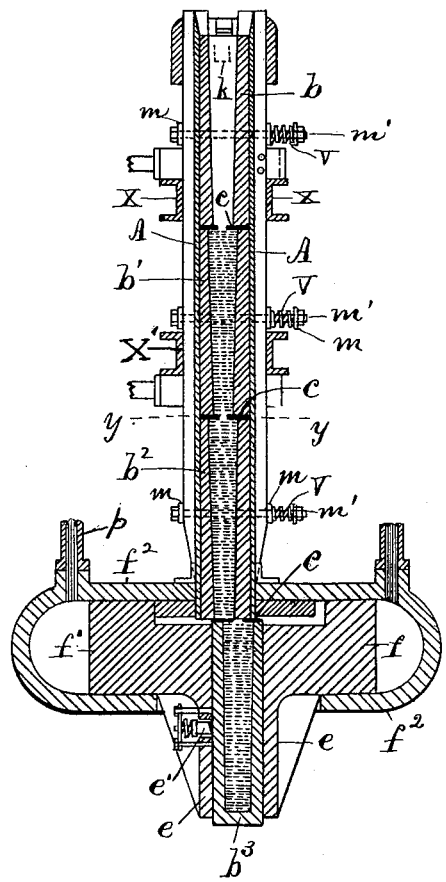
Attest:
L. Lee.
F. C. Fischer.
Inventor.
J. B. D'Arcy Boulton per
Crane & Willer, Attys.

(No Model.) 2 Sheets—Sheet 2.
J. B. D'A. BOULTON.
PROCESS OF FORMING INGOTS.
No. 388,336. Patented Aug. 21, 1888.
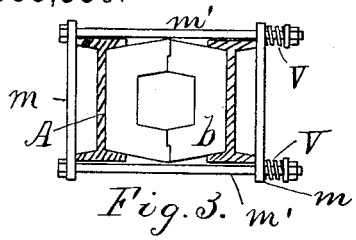
Fig. 3.
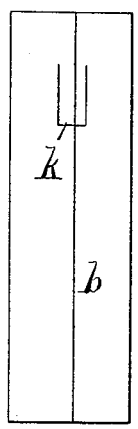
Fig. 4.
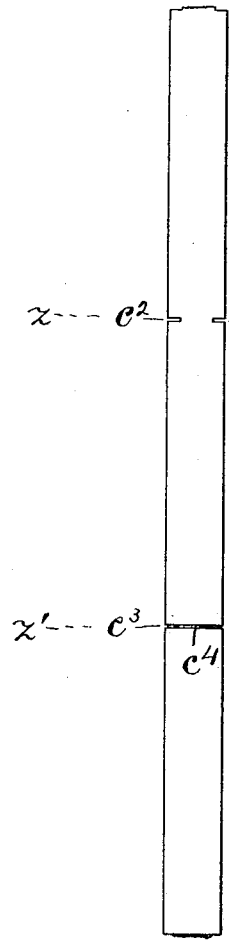
Fig. 9.
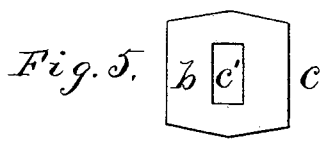
Fig. 5.
Fig. 6. ———— $c$
  $c$
Fig. 8. ———— $c$
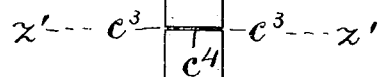
Fig. 10.
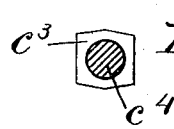
Fig. 11.
Attest:
L. Lee.
F. C. Fischer.
Inventor.
J. B. D'Arcy Boulton, per
Crane & Miller, Attys.

UNITED STATES PATENT OFFICE.

JAMES B. D'A. BOULTON, OF JERSEY CITY, NEW JERSEY, ASSIGNOR TO THE SOLID INGOT COMPANY, OF NEW YORK.

PROCESS OF FORMING INGOTS.

SPECIFICATION forming part of Letters Patent No. 388,336, dated August 21, 1888.

Original application filed March 25, 1887, Serial No. 232,362. Divided and this application filed June 22, 1888. Serial No. 277,872. (No model.)

*To all whom it may concern:*

Be it known that I, JAMES B. D'ARCY BOULTON, a subject of the Queen of Great Britain, residing at Jersey City, Hudson county, New Jersey, have invented certain new and useful Improvements in the Process of Forming Ingots, fully described and represented in the following specification and the accompanying drawings, forming a part of the same.

This patent application is a division of my patent application, No. 232,362, filed March 25, 1887, except in so far as it relates to the modification shown in Figures 7 and 8, and relates wholly to the sixth claim of said patent application.

The object of this invention is to form by a continuous process of casting a continuous steel ingot-bar with transverse grooves at intervals to facilitate its separation into a series of ingots. An ingot-bar formed with such grooves may be divided by stripping the mold-sections therefrom and severing the bar in any convenient manner; or the bar may, as is shown in my patent application, No. 232,362, be ruptured by shifting the mold-sections in succession laterally, with their contents.

The invention consists in the process hereinafter described, in which a vertical mold-section is first filled with fluid metal; secondly, a perforated packing or washer having its edge projected into the mold is applied at the end of such section; thirdly, a bottomless mold-section is superposed upon the filled section; fourthly, such second mold-section is filled with fluid metal, and, fifthly, another perforated packing or washer having its edge projected into the mold is applied at the end of such second section and the operation of applying bottomless mold-sections and perforated packings repeated as long as desired to form an ingot-bar of the desired length.

It also consists in the practice of such process with a yielding packing-washer applied to the upper end of each mold-section when filled, and having its edge projected into the mold to form transverse notches in the ingot-bar, such yielding packing serving the double function of making a close joint between the ends of the separate mold-sections, and also of forming the desired notches in the ingot-bar.

In the process first described above the perforated packing may be applied to the joint of the mold by laying it, after the mold is filled to the joint, upon the fluid metal at such point, in which case the dimensions of the packing would not exceed the transverse section of the ingot-bar; but in the process last described the packing would be made of a fibrous material like asbestus, and would be made large enough to lie upon the end of the mold-section, so as to be gripped between the ends of the opposed sections when one was superposed upon the other. In such case it would obviously be preferable to form the packing of yielding or fibrous material that it might serve the function of making a tight joint between the ends of the molds, and thus prevent the escape of the fluid metal.

Molds for crucible cast-steel are usually divided longitudinally and formed with planed joints which fit closely enough to retain the fluid metal, and the ends of the molds, if planed in a similar manner, will form a sufficiently close joint without the use of a packing-washer of any kind. When my perforated packing is applied to the fluid metal at the joint of the molds, but not inserted between the mold-sections, the contact of the molds themselves suffices to make a tight joint; but when the packing is inserted between the ends of the molds it is obvious that it must be made of such material and fitted to the ends of the molds in such manner as to pack the same at the same time that it performs its function of grooving the ingot-bar transversely.

Figures 1 and 2 of the drawings annexed hereto are the same as Figs. 1 and 2 of my said prior application, Fig. 1 showing a side elevation of an ingot-casting apparatus adapted to perform my process, and Fig. 2 being a vertical section of the same on line *x x* in Fig. 1. Fig. 3 is a transverse section on line *y y* in Fig. 2, showing one of the spring-clamps for the ways; and Fig. 4, a side view of the mold-section removed from the machine. Fig. 5 is a plan, and Fig. 6 an edge view, of a perforated packing or washer adapted to fit between the ends of the several mold-sections. Figs. 7 and 8 are a plan and edge view of a packing or washer adapted to lie upon the fluid metal at the joint of the sections. Fig. 9 is a side view of an ingot-bar provided with transverse grooves according to my invention. Fig. 10 is a transverse section on line $z\ z$ in Fig. 9, and Fig. 11 is a transverse section on line $z'\ z'$ in Fig. 9.

The apparatus is represented as sustained by beams X, resting upon the top of walls W, and upon beams X', extending between the cylinders I. The ingot-bar $c$ is shown partly inclosed in a series of separate mold-sections, $b\ b'\ b^2$, which are fitted to ways A, formed of two flanged beams pressed together by a strap, $m$, tie-bolts $m'$, and springs V. Hydraulic cylinders I are shown at the sides of the ways, and connected by piston-rods $i$ with head $t$, which is provided with weighted pawls $g$, fitted to notches $k$ in the sides of the mold-sections. The mold-sections will be constantly subjected to an elastic pressure within the ways and will be pushed downward in succession by reciprocating the head $t$. The top of each mold-section will be set just below the top end of the ways, the fluid metal then poured therein, and another mold-section will then be placed upon the top of such filled section, and the elevating of the head $t$ (by the hydraulic mechanism) will permit the pawls to engage with the notches $k$ in such superposed mold-section, and the reversal of the hydraulic mechanism will then move the head downward and force such superposed section down within the ways to the point occupied by the previous mold-section.

With a casting-machine of suitable dimensions the perforated washer could not be shown clearly in views which include the whole machine, as in Figs. 1 and 2; but the location of such washer or packing $c$ is clearly indicated in Fig. 2, and the packing itself in two forms is shown upon an enlarged scale in Figs. 5 to 8, inclusive. The packing or washer shown in in Figs. 5 and 6 is of the same dimensions as the end of the mold shown in Fig. 3, and adapted to lie upon the top end of the filled mold-section and to be held in the joint by the application of another mold-section thereto.

The aperture $c'$, which forms the perforation through the washer, is shown of oblong rectangular shape, and is adapted to indent the ingot-bar upon two opposite sides only, so as to form two opposite grooves, $c^2$, shown upon the ingot-bar, as in Figs. 9 and 10.

The washer in Figs. 7 and 8 is of the same dimensions as the ingot-bar, and is adapted, after the mold is filled, to be laid upon the fluid metal at the joints of the molds, and the perforation $c'$ through the same is adapted to form a neck, $c^3$, in the ingot-bar, as shown in Figs. 9 and 11, leaving the ingots connected by a stud, $c^4$. With either kind of washer the ingot-bar is notched at the joints of the molds, and the bar is thus adapted for severing at such joint by shifting the mold-section laterally with its contents. The means for thus shifting the mold is shown in Fig. 2, consisting in a pocket, $e$, sustained movably beneath the lower end of the ways A by hydraulic pistons $f\ f'$, mounted in a transverse cylinder, $f^2$.

Water-pipes $p$ are provided near the ends of the cylinder, and the introduction of fluid through such pipes serves to move the hydraulic pistons in the required direction and to shift the mold and its contents laterally, as desired. In Fig. 2 the pocket is shown provided with a spring-dog, $e'$, to retain the mold $b^3$ within the pocket until pushed therefrom. Such mold is shown shifted out of line with the mold $b^2$, as would be required to sever the ingot-bar, and the mold $b^3$ is shown with a bottom, which would be required in the first mold of the series to retain the fluid metal within the mold. The bar is also adapted to have the mold-sections at the lower end of the bar stripped from the bar successively when such portion of the bar is sufficiently cooled, and to have the bar severed at the joint of the molds, while a portion of the bar above such joint is retained in a heated condition within the upper mold-section.

In practice the shrinkage of the metal within the molds tends to clamp the adjacent ends of the molds together as if it were a tie-rod; but the washer when made of yielding material, as asbestus, and inserted between the ends of the mold-sections serves to relieve this end strain or pressure, and by reducing the friction between said mold-sections facilitates the lateral movement in severing the ingot-bar within the mold.

It will be understood that my process requires the use of a separate series of mold-sections which may in turn be superposed upon the top of the series and the ingots removed in turn from the bottom of the ingot-bar by severing the bar where it is notched by the perforated washer or packing.

By my process the formation of the ingot-bar may be continued indefinitely as long as mold-sections are applied to one end of the series and the ingots separated from the opposite cooled end of the bar. The ingot bar formed by my process is not, therefore, limited by the length of the mold, nor is it of any determinate length; but the number of ingots formed in a single series may be increased so long as the supply of fluid metal and the superposition of the mold-sections is continued. My invention thus differs from any single mold in which partitions are formed at intervals to divide the contents of the mold while fluid, as an ingot-bar produced in a single mold is necessarily limited to the length of the mold, and the filling of such a mold is done at a single pouring instead of in a succession of charges, as required in my invention.

I therefore disclaim any single mold provided with notched partitions or any series of molds superposed with intervening plates if such mold or molds be filled at one time by a single charge of fluid metal, as the product of such a casting would be an ingot of determinate length.

My process may be practiced in any suitable kind of sectional molds and with any apparatus adapted to hold the same during the casting operation.

What I claim, and desire to secure by Letters Patent, is—

1. The process herein described for forming a continuous ingot-bar in separable sections divided by notches, which consists, first, in filling a vertical mold-section with fluid metal; secondly, applying at the top of such filled section a packing or washer perforated to permit the passage of the metal; thirdly, superposing a bottomless mold-section, and, fourthly, filling the same with fluid metal and continuing the application of bottomless mold-sections and perforated washers at the joints of such sections as long as desired, substantially as herein set forth.

2. The process herein described for forming an ingot, which consists, first, in filling a vertical mold-section with fluid metal; secondly, applying to the top of such filled section a perforating yielding packing having its edge projected into the mold; thirdly, superposing a bottomless mold-section thereon, and, fourthly, filling the same with fluid metal, as and for the purpose set forth.

In testimony whereof I have hereunto set my hand in the presence of two subscribing witnesses.

JAMES B. D'A. BOULTON.

Witnesses:
THOS. S. CRANE,
HENRY J. MILLER.

It is hereby certified that the corporate residence of the assignee in Letters Patent No. 388,336, granted August 21, 1888, upon the application of James B. D'A. Boulton, of Jersey City, New Jersey, for an improvement in the "Process of Forming Ingots," was erroneously written and printed "New York," whereas said residence should have been written and printed *New Jersey;* and it is further certified that in lines 26-27, page 3, of the printed specification, the word "perforating" should read *perforated;* and that the said Letters Patent should be read with these corrections therein that the same may conform to the record of the case in the Patent Office.

Signed, countersigned, and sealed this 4th day of September, A. D. 1888.

[SEAL.]

D. L. HAWKINS,
*Assistant Secretary of the Interior.*

Countersigned:
    R. B. VANCE,
        *Acting Commissioner of Patents.*